Dec. 15, 1964
J. M. MORRIS
3,161,483
VIBRATING FLUIDIZED SYSTEMS
Filed Feb. 15, 1960
7 Sheets-Sheet 1
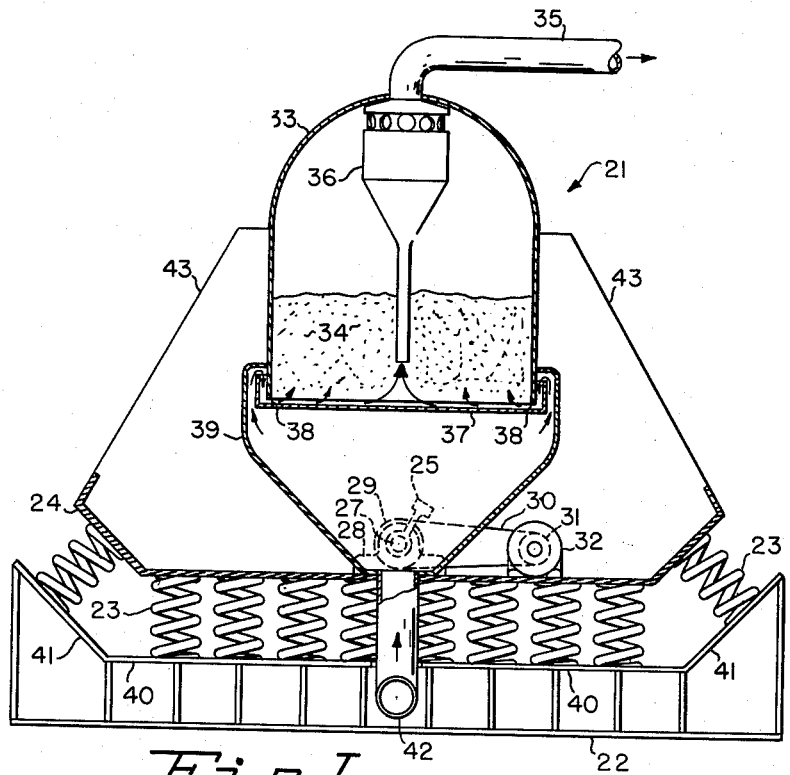
Fig. I
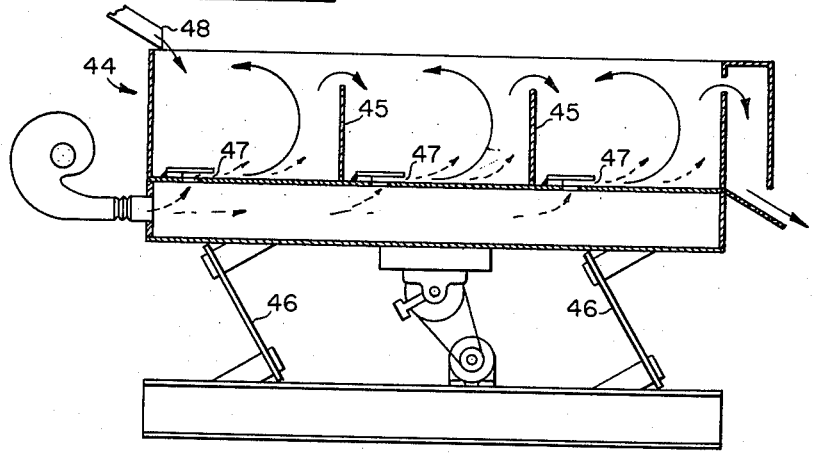
Fig. II
INVENTOR.
JOHN M. MORRIS
BY
Marshall, Marshall & Yeasting
ATTORNEYS

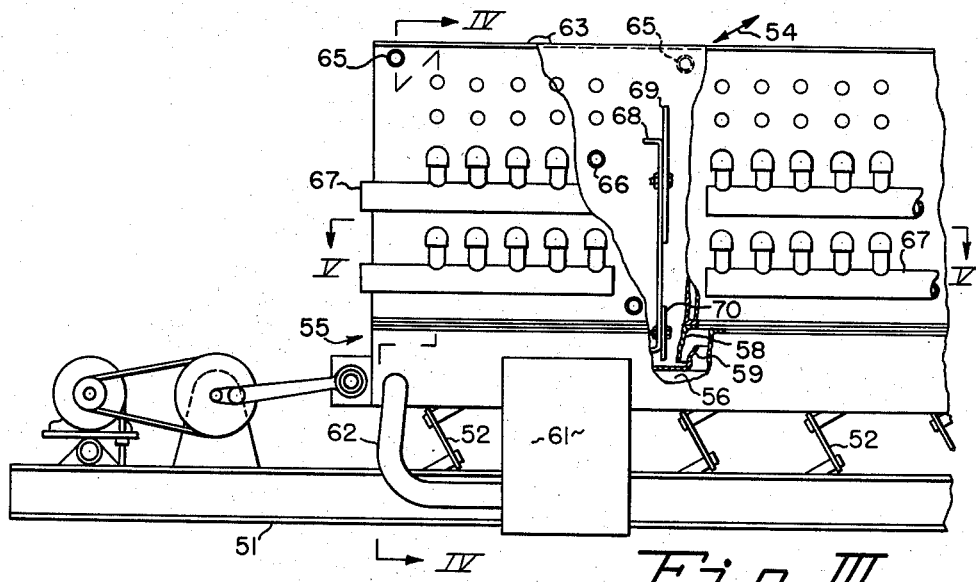
Fig. III
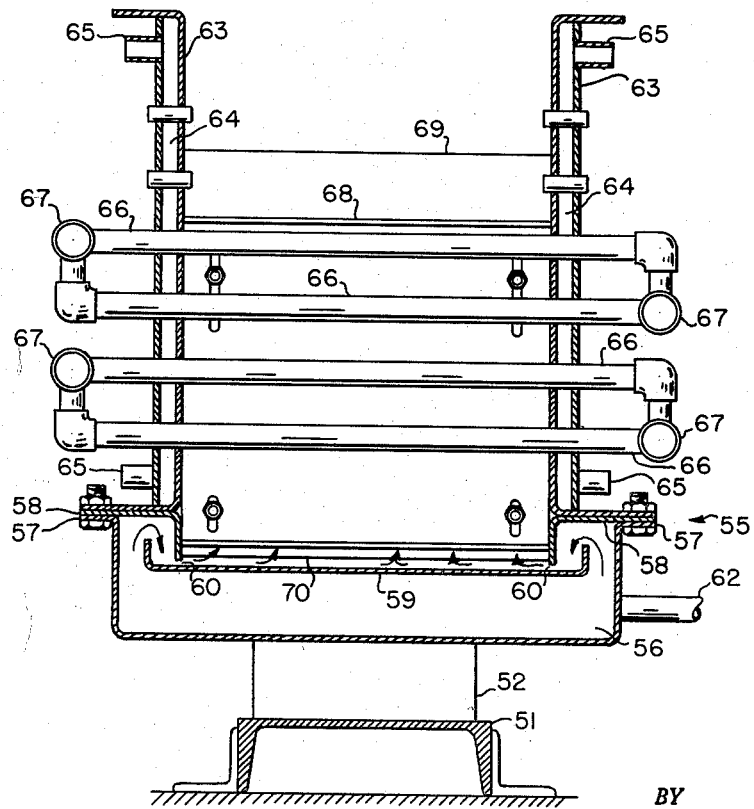
Fig. IV
INVENTOR.
JOHN M. MORRIS
BY
Marshall, Marshall & Yeasting
ATTORNEYS

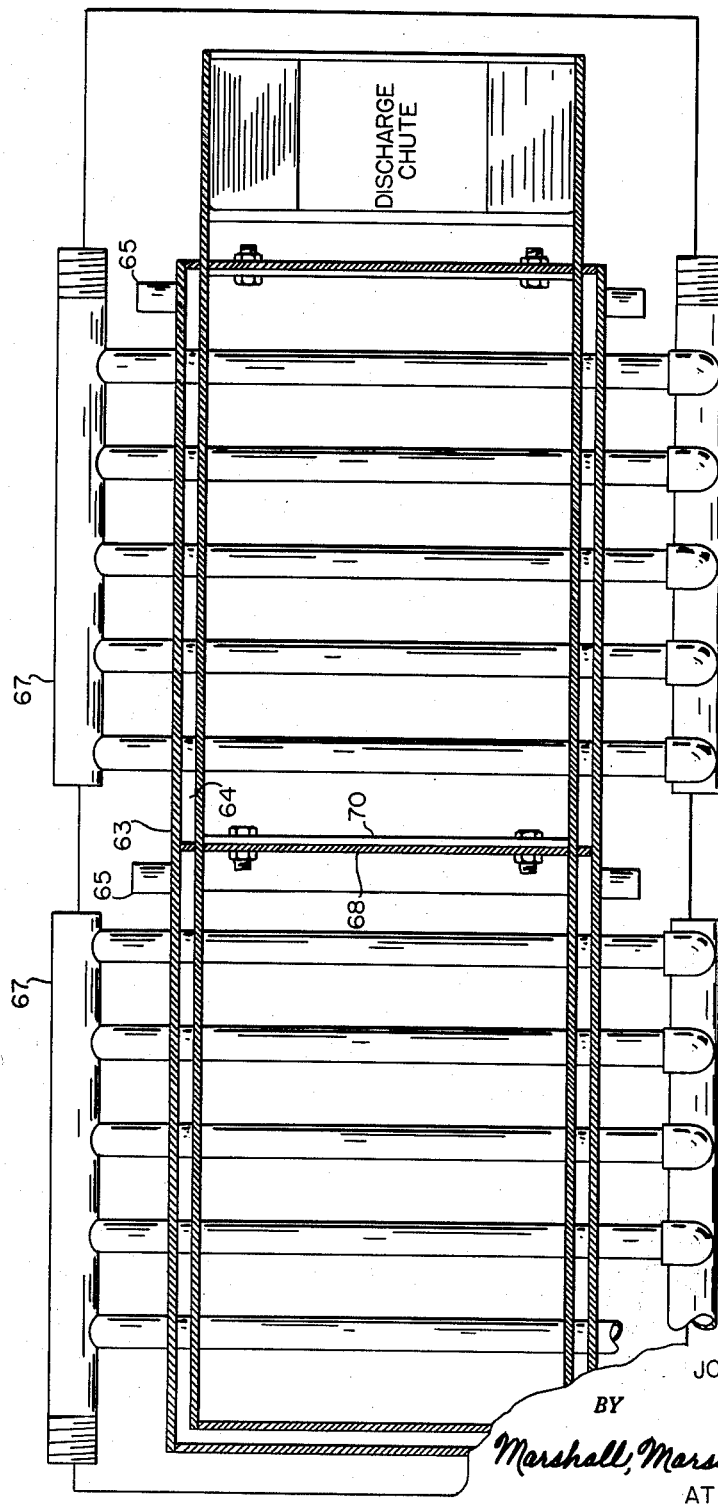

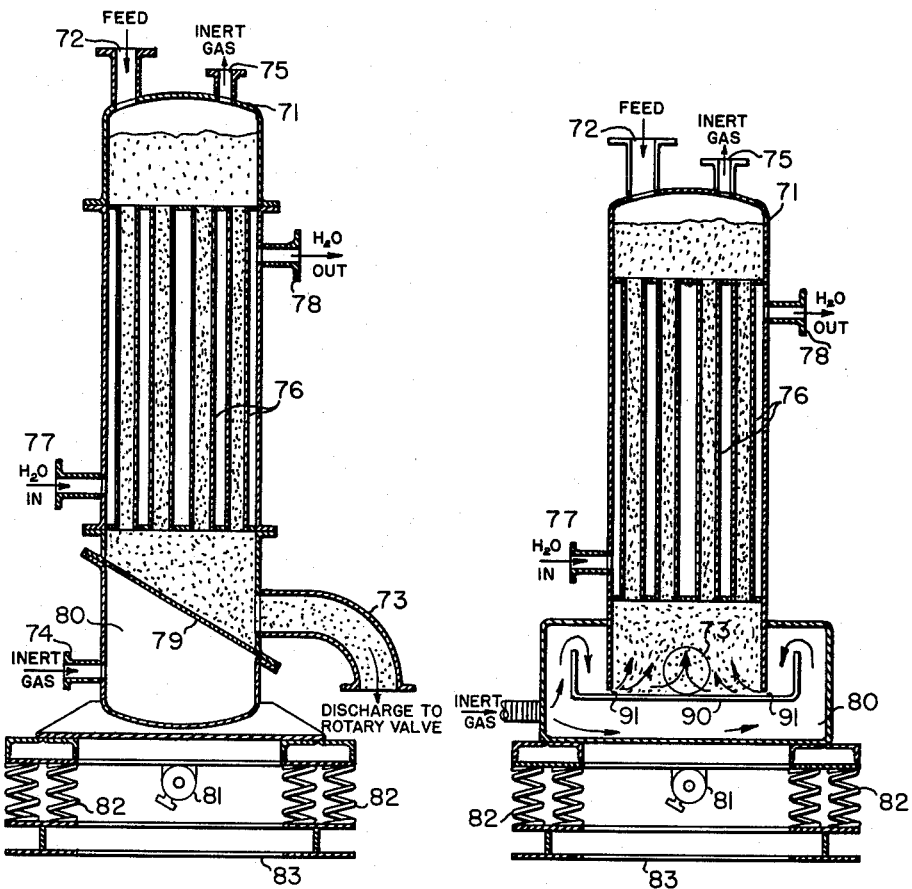

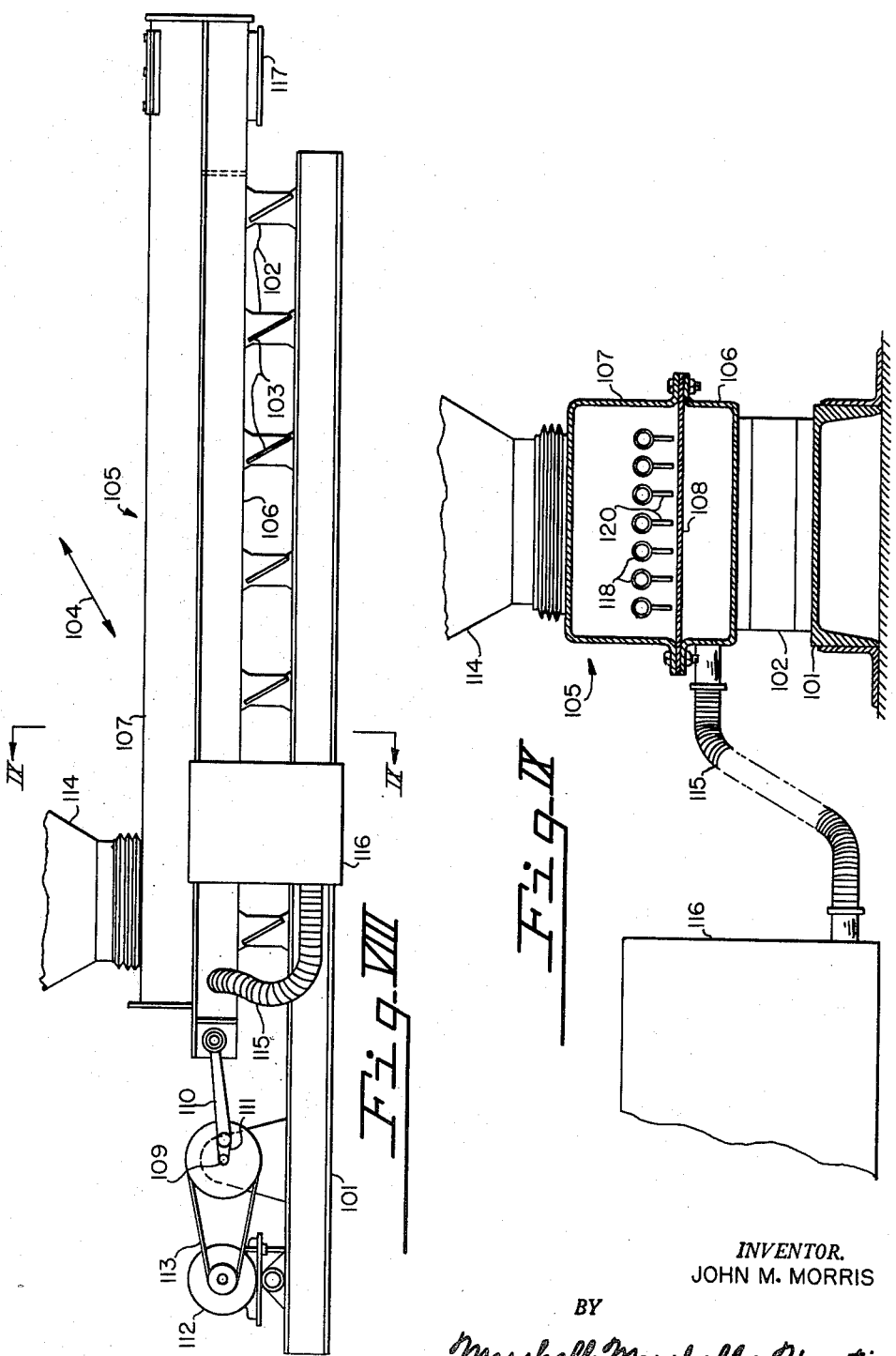

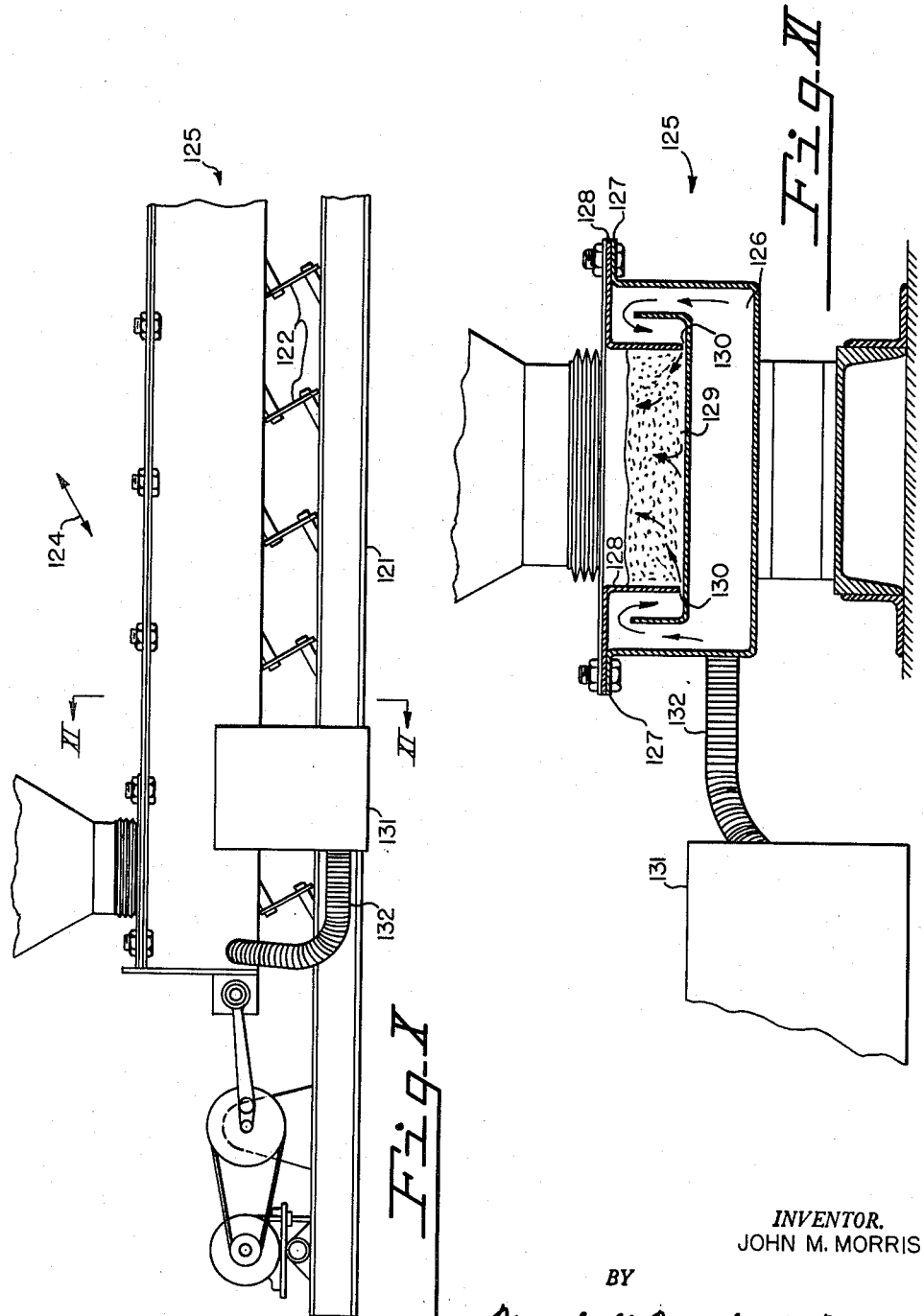

Dec. 15, 1964  J. M. MORRIS  3,161,483
VIBRATING FLUIDIZED SYSTEMS
Filed Feb. 15, 1960  7 Sheets-Sheet 7
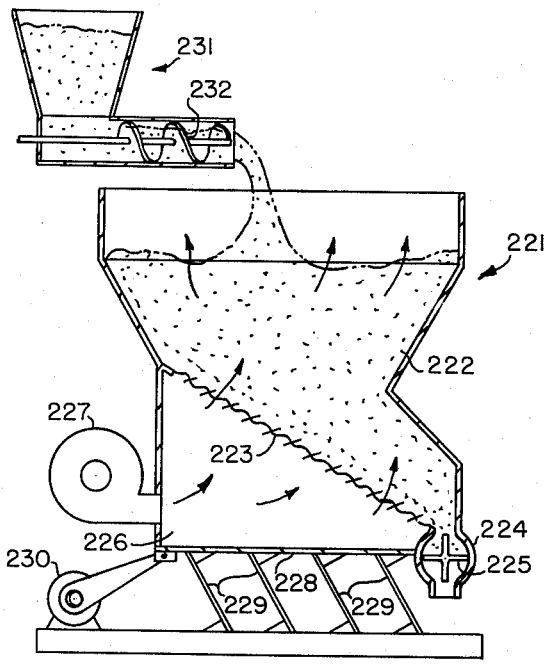
_Fig. XII_
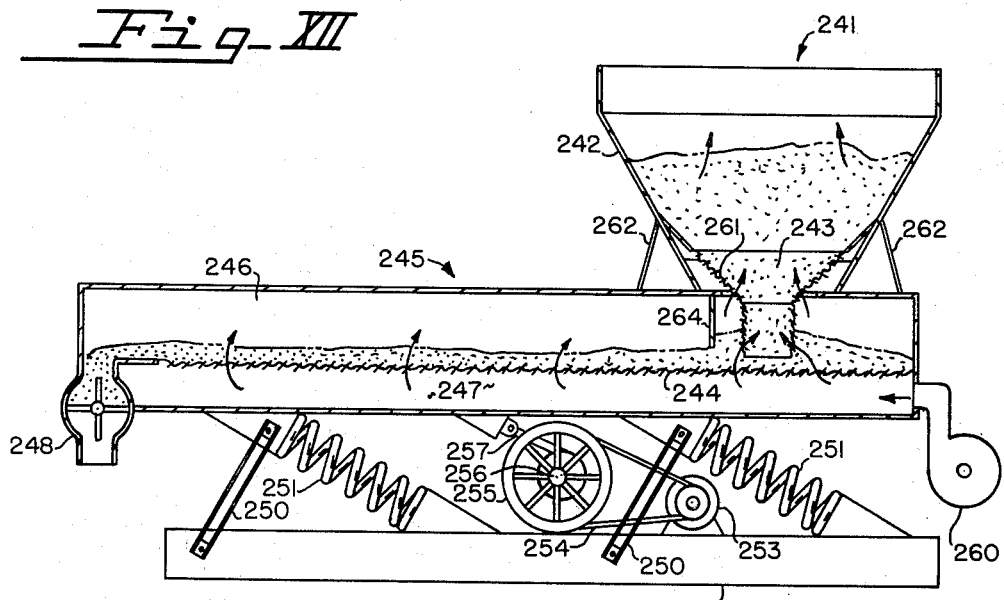
_Fig. XIII_
INVENTOR.
JOHN M. MORRIS
BY
Marshall, Marshall & Yeasting
ATTORNEYS

United States Patent Office 3,161,483
Patented Dec. 15, 1964

3,161,483
VIBRATING FLUIDIZED SYSTEMS
John M. Morris, Louisville, Ky., assignor to Rex Chainbelt Inc., a corporation of Wisconsin
Filed Feb. 15, 1960, Ser. No. 8,690
3 Claims. (Cl. 34—57)

This invention relates to methods and apparatus of fluidizing, aerating, air assisting, or other uses of fluids to treat, transport, catalyze, etc., materials in open and in closed vessels and, particularly, to the application of various vibratory techniques to said methods and apparatus for more effectively and efficiently accomplishing the desired results.

This application is a continuation-in-part of my copending application Serial No. 629,380, filed December 12, 1956, now abandoned, and a continuation-in-part of my copending application Serial No. 714,092, filed February 10, 1958, now U.S. Patent No. 3,062,414.

A great deal of research in the very recent years has been undertaken to understand, develop theory for, and utilize the techniques of fluid-solid systems in conveying applications, heat treating applications, and other applications such as catalytic cracking in the petroleum industry. The above examples merely indicate the vast interest and number of applications where such theories may be applied. In past years the fluids first worked with were of the liquid variety in such initial applications as flotation processes in the mining industry. In very recent years interest has turned to gaseous or aeriform fluids to be utilized in such fluid-solid systems. While the introduction of the use of gaseous or aeriform fluids has broadened the field of applications, it has also introduced problems which, while troublesome in the liquid-solid systems applications, were generally not of a nature to curtail the use of such liquid-solid systems in their early applications.

The fluid-solid system utilizing gaseous or aeriform fluids finds particular application where a great amount of heat transfer is desired, quantities of materials must be circulated or transported, or a mixing or catalytic process is desired. In the applications described above a number of problems have arisen. A layer of material is fluidized with a fluid flowing upward through suitably sized particles at a velocity sufficient to buoy the particles and to give to them a turbulent, fluid-like motion. Since the sizes of such particles in a layer of material either cannot be controlled to the desired extent or the particle sizes change due to attrition, it is probable that a certain amount of the fines of the material will become entrained in the fluid flow and either be lost as the fluid is discharged from the unit or require apparatus for separating the entrained solids from the fluid in the discharge path. Solids recovery cyclone separators are an example of apparatus now commonly in use in some systems to recover such entrained particles. In some applications, a plurality of stages of cyclone separators must be used in series in order to recover the fines, particularly when the fines may be an expensive material being utilized as a catalyst. When fluidized a bed or layer of material is similar in appearance and in some characteristics to a boiling liquid. These characteristics include the ability of a fluidized bed to flow in a manner similar to a liquid. In attaining such a fluidized condition, the layer of material expands from its initial state, when the fluid was not being passed up through the bed, to the final density of the fluidized bed. This amount of expansion depends upon the properties of both the solids and the fluid. For example, if the particles are larger than a certain size there is much less expansion than if particles are less than this predetermined size.

If the particles are of less than a certain size they have a tendency to ball up, cohere or agglomerate into rough spheres many times the size of the initial particles, thus causing the fluid to open up well defined channels through the bed. Sometimes particles of a particular size tend to pack together so that a fluid coming up through the bed pushed slugs of these packed particles ahead of the fluid. This packing, slugging, channeling and entrainment obviously affect the characteristics of the bed causing it to deviate from the ideal condition which is theoretically attainable and desirable.

An ideal fluidized bed has as one of its characteristics very rapid heat transfer and the large heat capacity of the solids within the bed prevents any very rapid change in temperature. Thus, it is very desirable to maintain a fluidized bed in as close to an ideal condition as possible. Heat transfer in fluidized beds occurs between the fluid and solid particles, between points within the bed, and between the bed and solid walls, with the largest heat transfer occuring principally by natural convection. Improper fluidization of a layer of material also sometimes results in bubbles of the fluid forming as the fluid rises through the bed with the result that the proper heat transfer, catalytic mixing, or circulation or mixing or transportation of the particles is not accomplished. The bursting of the bubble as it reaches the top of the bed adds to the entrainment of the fines in the fluid discharge, as discussed above, as well as adding to undesirable erosive effects of the materials on the equipment.

It is accordingly an object of this invention to provide improved methods and apparatus of fluidizing, aerating, and otherwise utilizing fluid-solid systems.

It is a further object of this invention to provide improved methods and apparatus for attaining such systems as described above by utilizing vibration techniques in combination with various fluid-solid system techniques to improve the efficiency and performance of such systems.

A still further object is to provide improved fluid-solid systems by applying vibration techniques to the vessel or vessels containing such systems, whether fluidization, aeration, or other type fluid-solid system is desired.

In accordance with the above objects a feature of this invention includes the application of vibration to such fluid-solid system which allows the use of a lower fluid velocity application to a bed of material in order to fluidize, aerate or otherwise treat the material in the system thereby lowering the losses of particles by entrainment in the exhaust fluid stream. Further, the use of vibration in such systems reduces the packing, tendency toward slugging, channeling and other undesirable characteristics of fluid-solid systems sometimes encountered in various applications. The invention thus teaches also improved heat transfer methods and apparatus. The invention also teaches improved conveying or transporting methods and apparatus for such fluid-solid systems. Application of the teachings herein thus improves mixings, chemical reactions, catalytic processes, etc., that utilize such fluid-solid systems.

In a great number of chemical engineering applications the basic elements in a fluidized solids system comprises the fluid bed, a standpipe, a transfer line and a solids recovery system. It was stated above how such fluid bed would be improved by the use of the teachings of this invention. Standpipes are utilized to circulate particles in the fluidizing system without the need for mechanical devices such as pumps, elevators, etc. As discussed hereinbefore, it is possible to do this since a fluidized bed has a number of the characteristics of a liquid. When utilizing standpipes a relatively high fluid density sometimes results because of the height of said standpipes and additional aeration or fluidization must be applied to or in the standpipe itself in order to compensate for gas compression as pressure increases. Obviously, if the use of vibration applied to the fluidized bed allows a lower velocity of fluidizing gas then such would also apply to the use of the vibration in connection with the standpipe allowing the application of less, or in some cases no, additional aeration to the standpipe itself. In transfer lines particles have been transported by gaseous streams in the years past but with the advent of gaseous fluidized systems the transfer line again has attention centered upon it. Although transfer lines normally run at higher gas velocities vibration techniques may be applied thereto to improve the functioning thereof.

As was mentioned hereinbefore solids recovery equipment is utilized in almost all fluidized systems since entrainment usually occurs even at lower velocities of the fluidizing gases. Also, as discussed hereinbefore one or a plurality of stages of cyclone separators may be utilized as the solid recovery equipment. It follows, therefore, that the ability to utilize a lower gas velocity to fluidize a system will decrease the amount of fines that will be entrained and thus decrease the liability of loss of fines from the system. Further, the inclusion of solids recovery equipment for removing entrained particles naturally opens the way to break downs in the system because of the erosive effects of the particles entrained in the exhaust fluid gases. Therefore, not only may the number of stages of solids recovery equipment be reduced but the break downs of such equipment may be reduced since the entrainment throughout the system is reduced.

Many other applications arise and will be possible from the applications of the teachings of the invention herein, one of which is the superior ability of the methods and apparatus to move different size particles relative to each other. Thus, a stream of coarse particles may be made to flow through a bed of fine particles while the fine particles may remain stationary or even counter flowing in the opposite direction. In the heat treatment field the heavier coarser particles may be moved at a slower rate to attain a desired temperature while the fines, which would attain the same desired temperature quicker, could be removed first. The teachings of this invention also include the ability to use such techniques in the field of material separations where coarser particles are moved in one direction to a discharge point while the fluidized fines are moved in an opposite direction toward a second discharge point.

Other objects, advantages and features of this invention will become apparent when the following description is taken in conjunction with the accompanying drawings.

FIG. I is a sectional view of a simple reactor mounted for the application of vibratory techniques in accordance with the teachings of this invention;

FIG. II is a diagrammatic view of a three compartment processing equipment employing vibration along an inclined path in combination with fluidization;

FIG. III is a side view, partially in section, of another embodiment of the teachings of this invention;

FIG. IV is a vertical sectional view taken substantially along the lines IV—IV of FIG. III;

FIG. V is a horizontal section taken substantially along the line V—V of FIG. III;

FIG. VI is a cross sectional view of a fluidized cooler embodying the teachings of this invention;

FIG. VII is a second embodiment of a fluidized cooler embodying the teachings of this invention;

FIG. VIII is a side elevational view of apparatus embodying one form of the instant invention;

FIG. IX is a transverse cross sectional view on somewhat enlarged scale taken substantially as indicated by the line IX—IX of FIG. VIII;

FIG. X is a side elevational view of another conveying and conditioning apparatus that may be utilized to perform the method and function of apparatus shown in FIGS. VIII and IX;

FIG. XI is a sectional view taken substantially as indicated by the line XI—XI of FIG. X;

FIG. XII is a side elevation partly in section of a hopper and a flow regulating member mounted to receive vibration to assist in fluidizing the material in the hopper; and FIG. XIII is a side elevation of a hopper and a vibratory conveyor arranged to convey material from the hopper to a discharge valve and to vibrate said hopper to assist in the fluidization of the material therein.

These specific figures and the accompanying description are intended merely to illustrate the invention and not to impose limitations on its scope.

Referring to FIG. 1 a simple reactor constructed accord to the invention comprises a reinforced reactor designated generally at 21 that is resiliently supported from a base 22 by a plurality of springs 23, preferably coil or helical although other types of springs may be used, interposed between an upper surface of the base 22 and the under surface of the subbase 24 of the reactor 21. Vibratory force from a pair of unbalanced weights 25 (only one of which is shown) carried on discs mounted on a shaft 27 is transmitted through the shaft bearings 28 to the reinforced reactor 21. The shaft 27 carries a pulley 29 that is connected through a belt 30 to a motor pulley 31 of a drive motor 32. The drive motor 32 may be mounted on the subbase 24 of the reactor 21.

The reinforced reactor 21 shown in FIG. 1 comprises an upper housing 33 containing a pulverulent material 34 which may be, for example, a catalyst. An exhaust passage 35 from the upper housing is provided having a cyclone separator 36 in series therewith to separate any entrained "fines" from the exhaust gases. An imperforate deck 37 is provided and supported just beneath the upper bell-shaped housing 33. The imperforate deck 37 is supported adjacent to the housing 33 so that slits 38 are formed between the deck and the upper housing. A lower housing 39 is attached and sealed to the upper housing above the cup-shaped imperforate deck. The lower housing 39 is connected to an air intake passage 42.

The upper and lower housings 33 and 39 may be supported and laterally braced by a plurality of ribs 43 which may be in turn spaced by a plurality of intermediate plates (not shown) extending from rib to rib. The entire reactor assembly 21 may have all seams welded, bolted, or otherwise secured so that when attached to the subbase 24 a construction of the utmost rigidity is attained.

The base 22 may be similarly fabricated from steel plates cut to appropriate sizes and welded together. This base comprises an upper base or portion 40 that has a generally flat upper surface and upwardly inclined winged portions 41 for each end to match corresponding upwardly extending portions of the subbase 24.

In the particular embodiment shown thirty-six coil springs 23 are used to support the reinforced reactor assembly 21 from the base 22. These springs are arranged in four rows with ten springs in each of the outer rows and eight springs in each of the inner rows. The end springs in each row are interposed between the inclined winged portions 41 of the base 22 and the inclined end portions of the subbase 24. These inclined end springs serve as stabilizing means to prevent lateral shift of the reactor container 21 on the vertically arranged intermediate springs. Each of the springs is provided with a spring seat at each end that is rigidly attached both to the spring and to the upper portion 40 or the inclined winged portions 41 of the base 22 and to the subbase 24 of the reactor assembly 21. Thus, the springs serve both in tension and compression during the vibration cycle and because of the rigidly connected end portions also act to prevent lateral displacement of the reactor assembly 21. Gases to be reacted are introduced into the lower housing 39 through the entrance passage 42. The gases to be reacted then flow over the upwardly extending sides of the cup-shaped imperforate deck 37, out through the slots 38, up through the material 34, through the cyclone separator 36 and out the exhaust passage 35.

The four center springs were eliminated from the array of springs for two reasons. First, there is a relatively small amount of mass concentrated at the center of the reactor 21 since most of the mass appears in the reinforcing ribs 43 and as well as the housings 33 and 39. Since this mass appears primarily along the sides and ends of the structure rather than at the center it is desirable to concentrate the springs along the marginal areas under this mass rather than at the center. The second reason for eliminating the central springs is that although other methods of introducing gas or gases into the lower housing 39 from the sides are usually preferable it may be necessary to introduce the gas from below. The embodiment shown therefore illustrates entrance from the bottom of the housing 39 through the entrance passage 42.

In some installations, depending upon the mass of the reactor 21 and its distribution, it may be desirable to eliminate more of the springs from the intermediate rows and thus leave the resilient support primarily around the marginal area of the subbase 24, and main base 22. This distribution may be determined by considering the relative mass of the end ribs 43 and in comparison with the side walls of the housings 33, 39, and any intermediate ribs utilized. Thus, if these latter members are relatively light it may be desirable to reduce the amount of resilient force applied to the midportions of the ends of the subbase 24.

Although different components of motion are transmitted to the reactor assembly 21 from the revolving eccentric weight 25, the various masses and springs of the system may be tuned to emphasize the vertical component as required to stabilize the fluidization of the bed of material in the reactor.

To illustrate in as simple a fashion as possible the principle of this invention a very simple reactor was chosen in which two or more gases were to be reacted in the presence of a catalyst 34 with the end product or products being discharged through the exhaust passage 35. It is to be noted that although only one entrance passage 42 has been shown that a plurality of entrances for different gases may be provided to prevent possible untimely reactions of the gases before gathering in the lower housing 39. For the purpose of simplification, however, it is presumed that the two gases to be reacted may be both entered into the entrance passage 42 at some point prior to the pick up of the system illustrated.

To obtain an ideal reaction condition for the two gases, it is desirable that the gases be forced up through the bed of catalyst particles 34 at a velocity sufficient to fluidize the bed so that the maximum amount of exposure to the catalyst may be attained. As was stated in the introduction, to attain such a fluidizing velocity and in attaining an ideal fluidized bed, several difficulties may arise which impede the creation of an ideal bed or, if an ideal fluidized bed is attained, some of the "fines" in the pulverulent catalyst material 34 are entrained in the exhaust gases and require the services of a separator such as illustrated at 36 or become so fine that a portion of the catalyst is lost with the exhaust products through the discharge passage 35.

It is to be noted that, although no provision is shown in FIG. I for recharging the catalyst or initially charging the reactor 21 with same, that such may be included, but it was deemed not necessary in the interests of simplicity, to show ports or other means in the reactor assembly 21 for the addition of such material. Although the original charge of catalyst material 34 may be of a particle size which contains a little fines which are apt to be entrained in the exhaust gas train, it is known that there is a considerable attrition of the catalyst material 34 in such systems due to the erosive effect of the particles on each other and against the housing walls of the reactor. Therefore, if fines are not present in a sufficient quantity in the initial charge of the catalyst material 34, over a period of operation the fines are developed and lost through entrainment. The other problems of packing, slugging, channeling, bubbles, etc., as discussed in the introduction also occur in such a reactor system. By the application of vibration to the reactor the catalyst material 34 was thrown upward on each vibration cycle and is separated from the imperforate deck 37 by an amount sufficient to allow the gases entering through the slots 38 to substantially fill the spaces created by the tossing upward of the materials 34. Thus, there is a uniform dispersion of the aeriform fluid so that it may rise through the pulverulent material 34 and fluidize the same whenever the reactor assembly 21 is being vibrated.

It is to be noted that hereinafter in the specification that the *required* velocity of the aeriform fluid rising through the pulverulent material to completely fluidize the pulverulent material when the reactor assembly is being vibrated is, as discussed in the introduction, less than the *standard* velocity which is the velocity required of the aeriform fluid to buoy, suspend and fluidize a pulverulent material in the absence of vibration. Of course, the apparatus may be utilized with higher velocities of aeriform fluid while overcoming the difficulties of packing, slugging, etc., but it is most advantageously utilized in instances where the fluidizing velocity can be kept to the lowest level possible and still obtain the ideal fluidized bed conditions. To distinguish the velocities that may have been utilized in connection with prior art apparatus it will be noted that one of the major advantages of the invention is fulfilled when the fluidizing velocity of the aeriform gas in cooperation with the action imparted to the particles by vibration is less than the standard velocity of aeriform fluid required to fluidize the same size particles in the absence of vibration.

In the apparatus shown in FIG. I two or more gases may be reacted as described in the presence of a catalyst 34 with the fullest possible exposure to the catalytic material 34 because of the attainment of a substantially ideal fluidized bed condition. While this may be attained by using a lower velocity to fluidize, the other problems associated with fluid-solid systems such as packing, slugging, channeling, formation of bubbles, etc., are also substantially overcome by the application of vibration.

In an apparatus such as that indicated in FIG. I the vibration of the reactor is principally along a vertical path. This vibration has several effects on the material being processed. As was mentioned, the vibration, by throwing the mass of particles upward from the deck, provides a low pressure region into which the fluidizing gas may flow and uniformly distribute itself. This by itself eliminates the need for a high restriction in the porous deck otherwise required to ensure uniform distribution of the gas flowing through the deck. The uniform distribution of the gas is essential because the natural tendency of the gas to follow the path of least resistance produces an unstable system. Any slight reduction is density in a localized region increases the gas flow through that region thus still further reducing the density until finally a channel or "blow hole" is formed up through the material and the gas and entrained fine particles erupt as a "geyser." Since this is a self-energizing phenomena a small force, effective before the process gets a substantial start, can prevent this channeling. Vertical vibration of the deck and fluidized bed provides this small force. The vertical vibration provides, in effect, a pulsating gas flow superposed on the average flow thus producing relatively high peak gas velocities with low average velocities.

These high peak velocities exist for very short times so that the particles are not entrained in the sense that they would be in a continuous gas flow of the same maximum velocity. Rather they are continuously agitated and mixed with the particles in the local regions of higher density tending to flow immediately into the regions of lesser density. This mechanically induced mixing in the bed of material thus breaks up any incipient low density regions before they can develop into bubbles or channels.

The mechanically induced movement of the particles may also be used to minimize "short circuiting" in fluidized beds. If the path of vibratory motion of the deck, the bottom of the container, is inclined to the vertical a horizontal conveying force is applied to the lower strata of the material. This induces a circulating motion in the bed with the material moving across the deck, up one side wall, across the top, and down the opposite side. The motion with uniformly distributed gas flow and no vibration is upward in the middle of the bed and downward adjacent the side walls. This motion is not rapid and it has been observed that some material finds its way across the top of the bed from inlet to outlet without entering the circulating flow path thus "short circuiting" the bed. Mechanical vibration acting along an inclined path establishes a pronounced circulation pattern so that fresh material entering the bed must make at least one circuit through the bottom of the bed before it can reach the discharge point.

This action is illustrated in FIG. II. As shown, a container 44 is divided into compartments by partitions 45. The container is mounted for vibration along an inclined path perpendicular to support and coupling springs 46. This vibration, even without any fluidizing gas tends to cause circulation of the material up one side wall and down the other as indicated by the curved arrows in FIG. II.

Fluidizing gas, for heating, cooling, or reacting with the material, is supplied through the bottom of the container. For this purpose the bottom may be porous as in a conventional fluidizing system or it may have one or more slits through which the gas enters. If the gas enters vertically the slits should be close together, i.e., separated by spaces not substantially greater than the stroke of the vibratory motion of the deck. If the gas enters horizontally a single slit each ten to twelve inches is sufficient since the gas can enter at high velocity as the bed of material is thrown upwardly. As illustrated, a series of slits 47 opening horizontally are shown. There may be one or more to each chamber.

In this arrangement material entering from a chute 48 and falling into the down moving stream of fluidized and vibrated material is carried down, across the bottom and up the opposite side before there is any chance of it being discharged. On a statistical basis most of the material particles make many trips before reaching the discharge. This is particularly true for the larger and heavier particle.

A two compartment version of this equipment is illustrated in detail in FIGS. III, IV, and V. In the operation of this equipment it was observed that large chunks of material, from a half to an inch in diameter, circulated along with the fine fluidized material as long as the container was vibrated. With gas flow only such chunks of material settle to the bottom and accumulate there.

Referring now to FIGS. III, IV and V there is shown apparatus utilizing the teachings of this invention which may be used either as a mixing apparatus or a fluidized heat exchange apparatus or as a combination of both. The apparatus shown in FIGS. III, IV and V comprises a base 51 to which transverse resilient supporting members 52 are secured in longitudinally spaced-apart relation. The members 52 may be of any of several types (e.g., cantilever leaf springs comprising a plurality of glass filaments in a matrix of synthetic resin) and operated to directionally control the movement of a conveyor assembly 55 in an inclined path of vibration indicated by the double tipped arrow 54, the conveyor assembly 55 being supported upon and fastened to the tops of the resilient members 52.

The conveyor assembly 55 comprises a plenum chamber 56 which may be trough shaped, as shown in FIG. IV, with flanges 57 extending outwardly from its upper rims. Removably secured to the flanges 57 are the angleform top members 58, the vertical portions of which dip into the conveyor channel 59. The lower edges of the vertical portions of the angle form top members 58 lie closely above the bottom of the conveyor channel 59, leaving narrow slits 60 through which sheets of air or other gas are blown over the bottom of the conveyor channel.

The path taken by gas passing from the plenum chamber 56 into the channel 57 is shown by curved arrows in FIG. IV. Each vibration of the conveyor assembly 55 tosses the mass of material upwardly and forwardly in the channel so that gas can flow from the slits 60 over the entire bottom of the conveyor channel 59 and up through the material that is being conveyed along the channel.

In order that the widths of the slits 60 may not change during the vibration cycle, the entire assembly 55 is vibrated as a unit. The air or other gas used for fluidizing the pulverulent or granular material may be supplied from a heater or cooler or other treating unit 61 connected to the plenum chamber 56 by a flexible tube 62.

Upstanding sides 63 may be added to the conveyor assembly to make the unit into a heat exchange or mixing apparatus as well as enlarging the capacity. The upstanding sides 63 may be equipped with flanges to be secured by the same bolts that secure the flanges 57 and 58 together. The upstanding sides 63 may have chambers formed therein as at 64 and have a plurality of heat absorbing or heat radiating medium entrances 65 through which a refrigerant or steam, for example, may be pumped into the hollow portion or chamber 64 and removed therefrom when its heat absorbing or heat radiating capacity is reduced to a predetermined extent.

There may also be a plurality of transverse lengths of tubing 66 carried by the upstanding sides 63 and connected to headers 67 through which as additional heat absorbing or heat radiating medium may be introduced. The lengths of tubing 66 are then heat radiating or absorbing surfaces in contact with the material carried by the unit.

The conveyor trough may be divided into a plurality of sections by the disposition of baffle plates 68 secured transversely in the conveyor trough itself and in the extension sides of the conveyor trough by welding or other suitable means. Slidably attached by means of bolts and slots to the baffle 68 are extensions 69 and 70 of the baffle plate 68. The lower extension gate 70 may be raised or lowered with respect to the bottom 59 of the conveyor trough so that if the material being treated has a portion of coarser materials which are not fluidizable the lower gate 70 may be raised so that these coarser particles may be conveyed along the bottom of the conveyor trough by the upward and forward tosses to a discharge point. The upper extension 69 of the baffle 68 may be raised so that a greater amount of material being fluidized may be retained in each section created by the addition of the transverse baffles 68 so that if desired an additional amount of heat exchange or mixing may take place before allowing the material to pass to the next section. Although no means has been shown in conjunction with the FIGS. III, IV and V for feeding material to the apparatus there illustrated any of the hoppers that are shown hereinafter may be utilized.

In operation, as material is initially added at the left side of the first compartment created by the baffle then vibratory action of the conveyor starts to convey the material along the bottom of the conveyor toward the right of the figure shown in FIG. III. When the pressurized aeriform fluid flows up through the material the buoying and suspending of the particles by the fluid in cooperation with the action of the particles controlled by the movement of the conveyor tends to make the mass of material in the first compartment rotate slowly in a counterclockwise direction. Thus, as material is added even though the material is added relatively close to the baffle plate the counterclockwise rotation of the material carries the newly added charge to the left and down and causes a thorough mixing as well as dispensing the additional charge uniformly in the fluidized bed. When an amount has been added to the fluidized portion in the first compartment sufficient to cause the material to spill over the upper extension 69 of the baffle plate 68, much in the same fashion as liquid would spill over when such a head developed, the material is passed on to the second compartment and/or succeeding compartments for further heat exchange or mixing. It is thus easy to see that the apparatus may be utilized as a very effective heat exchange unit since the mass of materials tends to rotate in a fluidized condition over the heat exchange tubing 66 and past the heat radiating or absorbing walls 63.

The apparatus may be utilized without the tubing or other type heat exchange to provide thorough mixing of two or more varieties of pulverulent materials. As stated above provision is made by the use of the lower gate allowing removal of nonfluidizable particles from each compartment by the material conveying action of the conveyor. If it is desired to have both the fluidizable components and the nonfluidizable components at the same temperature before discharge the movement of the fluidizable particles to the discharge point to the right can be controlled by raising or lowering the upper baffle extension 69 independent of the control of the coarser nonfluidizable particles which is accomplished by the raising or lowering of the lower baffle extension gate 70. That is, the coarse particles may be retained in each heat exchange compartment longer either by the variation of the vibratory forces or by the raising or lowering of the gate 70. Since the larger particles obviously need to stay in the heat exchange relationship of the fluidized bed longer to attain a certain temperature than the fluidized fines of the material, the apparatus illustrated in FIGS. III through V represents apparatus for regulating the temperature of all items discharged through a discharge point to a very close degree regardless of their relative sizes.

Referring to FIG. VI there is shown a cross sectional view of a fluidized heat exchange unit which utilized the teachings of this invention. The apparatus in FIG. VI comprises a housing 71 having an entrance feeding port 72 and a discharge feeding port or passage 73 to receive and discharge material which is to receive a heat exchange. The housing 71 also has an entrance fluid port 74 and an exhaust fluid port 75 to receive and discharge aeriform fluid which is to be utilized to fluidize the material being subject to heat exchange. The housing 71 contains a heat exchange means other than the fluidizing gas comprising a plurality of tubes 76 for conducting the pulverulent material down through the heat exchange apparatus and conducting the aeriform fluid up through the heat exchange apparatus. The tubes 76 are surrounded by a structure depicted as a water jacket, which in well known in the art, having means to receive at 77 and means to discharge at 78 a medium for absorbing or radiating heat. A porous deck 79 inclined with respect to the horizontal furnishes a support for the material being fed through the heat exchange apparatus.

The aeriform fluid is conducted through the entrance port 74 to a plenum chamber 80 beneath the porous deck 79. The aeriform fluid in the plenum chamber 80 is under sufficient pressure to cause it to rise through the porous deck 79, the material supported by the deck, the tubes conducting the material through the water jacket, and out the exhaust aeriform fluid port 75.

As in the case of each of the types of apparatus shown hereinbefore, there are means for vibrating the entire fluidized heat exchange apparatus including an eccentric weight vibration generating means 81 and a plurality of springs 82 supporting the heat exchange apparatus above a solid base 83. The vibration generating means 81 cooperates with the springs 82 to impart motion having a predominant vertical component to the particles of material being placed in heat exchange relationship. As has been explained hereinbefore the vibration imparted to the particles allows the use of a velocity of fluidizing gas for buoying and suspending the particles less than the standard velocity required for fluidizing the bed of pulverulent material in the absence of vibration.

In apparatus of the kind illustrated in FIG. VI the vibration becomes of more relative importance in avoiding the difficulties of slugging, channeling, packing, etc., than allowing the use of a lower fluid velocity. The ability to use the low fluid velocity is always of importance, however, when the area of a vessel in which a material is being fluidized becomes smaller or divided into sub areas (e.g., the tube 76) then the packing, slugging, etc., problems become more critical. The vibration of the unit, and thus the material, breaks up the tendencies of the material to cohere, agglomerate, pack, etc.

Referring to FIG. VII there is shown a heat exchange apparatus which is identical to that shown, and described in FIG. VI with the exception that an imperforate deck similar to the imperforate decks hereinbefore described has been substituted for the porous deck 79 of FIG. VI. The imperforate deck 90 must be placed adjacent to the downwardly extending sides of the housing 71 such that slits 91 are formed between the imperforate deck 90 and the lower side of the housing 71. Identical vibration means 81 and springs 82 are utilized such that a velocity is imparted to the particles having a vertical component sufficient to separate the particles from the deck when the deck is on its downward path of travel. As discussed hereinbefore this allows sheets of air to fill such separation and uniformly pass up through the material and in cooperation with the vibration establish a uniform, substantially ideal fluidized bed in the heat exchange apparatus.

It often is desirable to heat or cool powders for purposes of promoting or retarding polymerization or other chemical reactions or for driving off absorbed gases or moisture or otherwise conditioning the powders for further processing or for storage or use.

It is well known that because of the non-heat-conducting properties of masses of pulverulent material the procedure of changing temperatures of such masses is time consuming, and the uniform distribution of higher or lower temperatures through such masses often requires prolonged heat soaking or chilling.

Referring to FIGS. VIII and IX a method and apparatus is shown for not only rapidly and uniformly transferring heat to or from pulverulent material but also for conveying such material from one point to another while the heat transfer is occurring, whereby pulverulent material of any average temperature can be continuously received at one point in the apparatus and rapidly heated or cooled while being conveyed to another point where it may be discharged with a higher or lower temperature uniformly distributed throughout the mass.

Finely powdered commodities such as flour, starch, cement, molding powders, pigments and the like do not move freely along vibratory conveyors which function by tossing particles upwardly and forwardly, for the reason that particles of fine powder in layers cling together in sheets which are held against the vibratory decks of heretofore existing types of conveyors by atmospheric pressure. The substantialy impervious sheets of powder cannot be tossed along the decks without creating partial vacuums beneath the sheets.

The characteristic of a layer of powder which prevents it from being moved effectively by a vibratory conveyor can be altered by causing a gas such as air to flow upwardly below the layer, thus counteracting the atmospheric pressure above it by relieving the vacuum below it and restoring to the particles individual freedom of movement. Masses of powder so aerated may be rendered flowable to such an extent that they are generally said to be fluidized.

If a mass of powder is aerated to such an extent that it is fluidized, the insulating properties of the mass are greatly reduced and the discreet particles can be readily heated or chilled. Heat can be transferred to or from the discreet particles of an aerated or fluidized powder by radiation, convection, or conduction. Such heat transfer also is promoted by agitation of the particles such as occurs when they are tossed along a vibratory conveyor.

Referring now more particularly to FIGS. VIII and IX, the apparatus comprises a base 101 to which transverse resilient supporting and guiding members 102 are secured in longitudinally spaced-apart relation, said members may comprise rubber or rubber-like blocks having obliquely disposed guiding struts in the form of metal plates or rods 103 molded therein so as to directionally control the relative movement between a conveyor assembly 105 and the base 101 in an inclined path of vibration indicated by the arrow 104. Other types of resilient supporting members, such as described hereinbefore, may be utilized. The conveyor assembly 105 is supported on and connected to the tops of said series of resilient members 102.

The resilient members 102 as herein shown are to be regarded as merely illustrative. Numerous other forms thereof, e.g., those that are disclosed in Patent No. 2,706,112, granted April 12, 1955, may be substituted. Moreover, in some instances, satisfactory results have been obtained with other known forms of resilient mounts such as coil springs or leaf springs extending obliquely between the base 101 and the conveyor assembly 105 (see the disclosures of Patent Nos. 2,630,210 and 2,630,211, granted March 3, 1953).

The conveyor assembly 105 as shown in FIG. I is in a horizontal position, but said conveyor assembly may be inclined upwardly or downwardly if desired, within a certain range of slopes for maximum efficiency. Moreover, the conveyor assembly may be helical, as disclosed in Reissue Patent No. 22,804, granted August 12, 1947.

The conveyor assembly 105 comprises mating opposed channel-shaped parts 106 and 107 which are bolted or otherwise secured together to clamp a porous or semipermeable deck 108 therebetween.

If desired, struts may be secured at longitudinally spaced intervals transversely across the upper edges of the lower channel-shaped part 106 to rigidify the deck 108 and also to assist in supporting the loads of conveyed material thereon.

Any suitable means may be employed for imparting to the conveyor assembly vibratory movement along the path 104. The vibratory movement-imparting means is shown, by way of example, as comprising an electric motor-driven crank shaft 109 having a rod 110 pivotally connected to the crank 111 of said crank shaft and to the end of the conveyor assembly 105.

The crank shaft 111 is driven by an electric motor 112 which may be of the variable speed type or may be equipped with variable speed pulley and belt transmission mechanism 113.

Other vibratory movement-imparting means such as electromagnetic vibrators, revolving eccentric weights or the like are well known in the art and may be substituted for the crank and connecting rod vibratory movement imparting means.

Above one end of the conveyor assembly 105 is a feed hopper 114 for introducing conveyable material upon one end of the deck 108. Connected to the lower channel-shaped part 106 adjacent the feed hopper end of the conveyor assembly 105 is a flexible hose 115 which leads into a chamber formed between the lower channel-shaped part 106 and the deck 108. The flexible hose 115 communicates at its other end with a unit 116 for supplying a gas such as air under pressure, which may include an air preheater or cooler, as well as a motor-driven blower and volume and pressure controls, all of which are commercially available and none of which are shown in the drawings.

Although the gas to be supplied under pressure through the tube 115 will in most cases be air, other gases may be employed. When the terms "air" and "aeriform fluid" are used in this specification and in the claims these terms are intended to mean any suitable aeriform fluid.

As above indicated, the air may be pre-heated so that it may serve to drive off absorbed gases or moisture or to promote polymerization or otherwise condition the powder, as well as to aerate or fluidize it. Similarly, the air may be chilled to extract heat from the powder or otherwise condition it.

The form of apparatus shown in FIGS. VIII and IX confines the heated or chilled air within the conveyor assembly 105 until the air reaches a discharge port 117, from whence the air, if desired, may be recirculated.

Instead of, or in addition to, preheating or cooling the air before it is supplied to the conveyor assembly 105, heat transfer tubes 118 having fins 120 may be located within the upper channel-like part 107 of the conveyor assembly. The tubes may be carried by the vibratory trough 105 assembly as shown in FIG. IX, or they may be stationary. Where heat transfer tubes are employed the particles of powder as they dance along the deck 108 are heated, or cooled, largely by radiation from the tubes or from the particles. In such case it is less important to recirculate the air, and the top of the conveyor assembly 105 may be left uncovered.

Broadly stated, the apparatus shown in FIGS. VIII and IX provides conveying and temperature changing apparatus for pulverulent material comprising an elongated gas-pervious deck, said deck having a permeability such that there will be substantially no sifting therethrough of the finer particles of the material to be conveyed while providing for the passage therethrough of aeriform fluid, means for causing the flow upwardly through said deck of aeriform fluid at a rate not substantially in excess of that required to fluidize the bed of material to be conveyed, and means for vibrating said deck with a motion such that the work surface of said deck has a predetermined angle of attack and a vertical acceleration greater than the acceleration due to gravity. Even more broadly stated the apparatus discloses means for fluidizing a bed of material, which fluidization is assisted by vibrating said bed of material. Whether the primary object is fluidizing or conveying depends upon the application but the apparatus shown is capable of having one predominate action.

In the apparatus shown in FIGS. VIII and IX a vibratory conveyor functions by tossing particles of material upwardly and forwardly with each vibratory cycle, and aeriform fluid injected in minute jets through a permeable deck of such a conveyor mingles readily with the particles that are being agitated by vibration. The openings in such a deck must be small enough to prevent loss of particles of material therethrough. Thorough cleaning of a permeable deck is difficult, and thorough cleaning is frequently necessary when the apparatus is used to process successive batches of materials which differ in color or in other characteristics.

Referring to FIGS. X and XI there is shown apparatus to perform the method disclosed above which provides means for aerating pulverulent or granular material as it is being conveyed along a vibratory conveyor having a channel with an imperforate bottom or deck. Again this may be broadly stated as means for fluidizing a bed of material, said fluidization being assisted by the vibratory action of the conveyor. Also again, whether the fluidizing or conveying action is dominate depends upon the desire of the operator. The apparatus may be adjusted to cause either to dominate. More specifically there is shown means for blowing sheets of gas transversely across the bottom, i.e., the deck of a vibratory conveyor channel so that, as material being conveyed is tossed away from such deck by vibration, the gas rushes into the space beneath the material, from where it is forced through the material as the material and deck move toward each other to close the space during a later phase of the cycle.

The apparatus shown in FIGS. X and XI comprises a base 121 to which transverse resilient supporting members 122 are secured in longitudinally spaced-apart relation. The members 122 may be any of several types. They may consist of cantilever leaf springs comprising a plurality of glass filaments in a matrix of synthetic resin (such as are disclosed in Patent No. 2,829,831 issued to John M. Morris on April 8, 1958). In any case, the members 122 directionally control the movement of a conveyor assembly 125 in an inclined path of vibration indicated by the double-tipped arrow 124, the conveyor assembly 125 being supported upon and fastened to the tape of the resilient members 122.

The conveyor assembly 125 comprises a plenum chamber 126 which may be trough shaped, as shown in FIG. XI, with flanges 127 extending outwardly from its upper rims. Removably secured to the flanges 127 are angleform top members 128, the vertical portions of which dip into a conveyor channel 129. The lower edges of the vertical portions of the angle-form top members 128 lie closely above the bottom of the conveyor channel 129, leaving narrow slits through which sheets of air or other gas are blown over the bottom of the conveyor channel.

The path taken by gas passing from the plenum chamber 126 into the channel 129 is shown by curved arrows in FIG. XI. Even in cases in which the flow of gas is insufficient to "fluidize" the material in the channel each vibration of the conveyor assembly 123 tosses the mass of material in the channel so that gas can flow from the slits 130 over the bottom of the chamber 129, under and up through the material that is being conveyed along the channel.

Whether the material is aerated merely to increase the speed at which it is conveyed, to dry it, to cool it, or to heat it by means of hot air, or whether the fines content of the material is fluidized, depends upon: the nature of the material being processed, the inclination or declination of the conveying channel, the air pressure in the plenum chamber, and the consequent velocity of air flow, the frequency and amplitude of vibration, the widths of the slits 130, and other conditions which can be modified or adjusted according to the results desired.

In order that the widths of the slits 130 may not change during the vibration cycle, the entire assembly 125 is vibrated as a unit. The air or other gas used for treating the pulverulent or granular material may be supplied from a heater or cooler or other treating unit 131 connected to the plenum chamber 126 by a flexible tube 132.

It is only necessary to remove the top members, which are held in place by bolts, to make the top members and the channel accessible for cleaning, for example by means of an air hose or a vacuum cleaner. In vibratory conveyors having gas-permeable decks it has been necessary to make such decks of fine screens, using thin wire, the conveyor channel in the apparatus shown in FIGS. X and XI can be as heavy and sturdy as is required to avoid deterioration in use and damage in cleaning, whether the material being processed is coarse or fine, soft or abrasive.

Referring to FIGS. XII and XIII there is illustrated material handling equipment for temporarily storing and feeding pulverulent materials such as flour, powdered sulfur, Portland cement, and similar materials that tend to arch in the hoppers.

One difficulty with trying to feed certain powdery materials from a hopper is the fact that the material instead of flowing uniformly from the hopper tends to arch across thereby cutting off the flow and then when the material is agitated as by rapping the sides of the hopper to break the arch the material floods or flows in excess of that desired. The apparatus in FIGS. XII and XIII provides means for facilitating the flow of such powdery material and for regulating the flow as may be desired for subsequent processing operations. Further, means are provided for forcing an aeriform fluid through the material in the hopper while such material is being fed slowly from the hopper and out through a flow regulating device. Still further, vibratory techniques are utilized for assisting the flow of fluidized material from a hopper to a flow regulating device and to assist in the fluidization of the material in said hopper as discussed hereinbefore.

According to the invention a supply hopper is formed with side walls leading to a discharge chute that has either a flat or an inclined bottom made of a porous material. An opening in one side of the hopper chute leads to a star or rotary valve or similar valving means and a fan or other source of pressurized aeriform fluid is supplied to the space beneath the porous bottom of the hopper chute so as to cause the aeriform fluid to flow upwardly through the material thus partially or completely fluidizing it for enhancing its flow characteristics so that it freely flows to the valving means which in turn permits it to flow from the system at a uniform rate. The porous bottom of the hopper may be part of a conveyor system that terminates in an air lock or similar device to prevent the aeriform fluid from escaping along the conveyor with the material being fed instead of being forced upwardly through the stored material in the hopper. It is to be realized that other means of fluidizing the hopper may be utilized in lieu of the porous deck. For example, an imperforate deck receiving pressurized aeriform fluid from slits along the side as described hereinbefore may be combined with the vibrating hopper.

FIG. XII illustrates an arrangement in which a hopper 221 has an inclined downwardly directed discharge chute 222 equipped with a porous bottom 223. The discharge chute leads to a downwardly directed discharge passage 224 forming a valve chamber for a rotary valve 225. The material is moved past the rotary valve 225 at a uniform rate as the valve 225 rotates in the valve chamber 224 and serves to pass substantially equal volumes of material for each revolution. A plenum chamber 226 is provided under the porous bottom 223 and an aeriform fluid is supplied by a fan or other means 227 feeding directly into the plenum chamber.

The assembly of the hopper 221, valve chamber 224 with its valve 225, and the plenum chamber 226 form the moving member of a vibratory conveyor. The assembly is mounted from a base 228 by a plurality of inclined leaf springs 229 which, preferably, are selected and adjusted so that they cooperate with the mass of the assembly of hopper and chambers to form a vibratory system having a resonant frequency at the desired speed of operation. The vibratory system is kept in vibration by a motor driven crank and connecting rod assembly 230 mounted on the base 228 and and connected to the assembly of hopper 221 and plenum chamber 226.

The material is fed to the hopper 221 from a partially aerated storage silo or bin 231 and screw or other type of conveyor 232 that is controlled to maintain a generally constant amount of material in the hopper 221.

It is necessary to use a star valve or similar discharge limiting or regulating member with the fluidized system for two reasons. First, such a member limits or minimizes the escape of the aeriform fluid along with the material being discharged which would otherwise occur when the aeriform fluid is fed into the bottom of the hopper adjacent the discharge opening. Secondly, as soon as the material in the hopper is fluidized with the aeriform fluid it tends to flow like a liquid and would flow out of the hopper at a very rapid rate. Variable sized orifices in the discharge opening 10 are not satisfactory for limiting or regulating such flow of material because such orifices, being located close to the path of the incoming aeriform fluid, would by-pass the fluid out through the orifice. This action would draw the powdery material from the bottom of the chute while leaving the material in the hopper in a non-fluidized condition apt to form arches blocking the flow into the chute. To eliminate this effect the material is fed into a positive rotary air lock or star valve that limits or substantially prevents the escape of fluid along this path and forces the fluid up through the material in the hopper to keep it in a fluidized condition.

In the foregoing arrangement the material flow is at least in part by gravity from the hopper to the flow regulating device such as the rotary valve 225. The uniformity of flow to the regulating device is enhanced by the fluidization of the material in the hopper by the aeriform fluid supplied by the fan 227. The overall result of fluidization, particularly with vibration, is a very accurate uniform density flow of material from the flow regulating member.

While these arrangements are satisfactory for many types of materials there are some materials which do not fluidize evenly or tend to stick and the performance of the system may be materially improved by forming the bottom of the chute, the porous member, as part of an elongated deck of a vibratory conveyor. Such arrangements are illustrated in FIG. XIII.

Referring now to FIG. XIII, a hopper 241, provided with converging side walls 242 that terminate in a chute 243, discharges onto a porous deck 244 of a vibratory conveyor 245. The vibratory conveyor 245 comprises a closed material conveying channel 246 above the porous deck 244 and a plenum chamber 247 below the deck. The discharge end of the channel 246 is provided with a rotary valve 248 or similar material flow regulating member to control the rate of discharge from the conveyor.

The vibratory portion of the conveyor including the hopper 241, the material conveying channel 246, and the plenum chamber 247 is supported on a plurality of leaf springs or links 250 serving as guides and a series of helical springs 251 that connect the vibrating portion of the conveyor to a base 252. The spring rate of the springs 250 and 251 is selected so that the springs form with the conveyor a vibratory system having a natural frequency at the desired frequency of operation. The system is driven by a motor 253 that is connected through a belt 254 and pulley 255 to a crank shaft 256 having a crank, not shown, that is connected through a connecting rod 257 to the vibratory portion of the conveyor 245. While a particular method of supporting and driving the vibratory conveyor is illustrated it should be understood that any of the conventional methods of supporting and operating vibratory conveyors may be employed.

Air under pressure is supplied from a fan 260 that discharges into the plenum chamber 247 to maintain a sufficient air pressure in the chamber to force the air upwardly through the porous deck 244 and the powdery material thereon. After passing through the powdery material on the deck 244 the air passes toward the hopper, since it cannot escape past the rotary valve 248, and enters the hopper by way of porous hopper walls 261 extending from the upper end of the chute 243 to portions of the hopper walls 242 that are connected through supporting frame members 262 to the conveyor 245. Thus, the space beneath the porous hopper walls 261 forms a sort of plenum chamber that is supplied with air from the material conveying channel 246. Preferably the side walls of the chute 243 are also made of porous material so that any air collecting in the material conveying channel 246 adjacent the chute 243 may flow into the material in the chute by way of the porous side walls.

An adjustable baffle plate 264 may be provided adjacent the chute 243 to regulate the height of the material flowing along the conveyor porous deck 244, particularly if the material along the conveyor deck is not completely fluidized.

This particular arrangement makes a very efficient material handling system because the fairly large area of the porous deck 244 provides a relatively slow flow of air through the material on the deck in quantities just sufficient to prevent the powdery material from adhering to the deck during the return stroke of the vibratory motion. This provides good vibratory conveying action since the material tends to compact itself without adhering or sticking to the deck. The air collected above the material flows up through the hopper which has a relatively small area in comparison with the deck 244 resulting in a higher air velocity and therefore substantially complete fluidization of the powdery material in the hopper. The combination of these effects results in a free flowing of the material out of the hopper 241 through the chute 243 onto the conveyor 245 and then a fairly rapid conveying action along the conveyor 245 to the rotary discharge valve 248 that serves to prevent the escape of air or other aeriform fluid from the conveying channel 246 while permitting the escape or delivery of the powdery material. This system takes advantage of partial fluidization during the conveying portion of the process and nearly complete or complete fluidization of the material in the supply hopper so as to maintain all of the material in a free flowing condition for steady movement from the hopper to the conveyor and out through the discharge regulating valve 248.

It is to be noted that the mode of applying the pressurized aeriform fluid to fluidize the materials in FIGS. XII and XIII is exemplary only. For example, an imperforate deck with slits along the sides as described hereinbefore is also suitable. The vibration techniques as applied are valuable in overcoming the difficulties of fluid-solid systems utilizing hoppers as is described previously.

The addition of vibration to fluidizing systems provides very substantial improvements in practically all such systems. In the deep bed systems the pulsating gas flow and mechanical agitation provide a uniformity of fluidization throughout the bed and elimination of "blow holes" and bubbles so that a substantially lower free space gas velocity is entirely adequate. This very markedly decreases the quantity of fines entrained in the gas thus decreasing the load on the dust separators.

As previously mentioned the vibration, if inclined to the vertical, provides circulation of the material regardless of particle size.

While these advantages are important, the use of vibration permits the fluidization of materials that are otherwise impossible to fluidize as well as the fluidization of thin beds of material.

As an example of the ability of vibration to distribute the fluidizing gas and enable fluidization of otherwise unfluidizable materials, a bed of flax seed from ½ to ¾ of an inch thick was carried on a vibrating conveyor deck one foot wide formed of a series of triangular rods having aligned upper surfaces and thin slits between the bars. When generally horizontal the deck was vibrated through a 5⁄16 inch stroke at an angle of 60° to the horizontal at a frequency of 870 to 900 cycles per minute the material was conveyed at from five to ten feet per minute with very little turbulence or mixing. With the conveyor stationary, no vibration, and a flow of air through the slits the bed remained quite solid with blowholes formed over the slits. There was no observable fluidization. With the same air flow of thirty cubic feet of air per square foot per minute and vibration of the deck as described above, the bed of material is fluidized and displays a uniform soupy boiling action with no blow holes or air channels through the material.

The stabilizing effect of the vibration on the fluidization in apparatus as shown in FIG. XI may be used to advantage with particles as large as one-eighth diameter in a three inch deep bed. In this case a bed of pellets three inches deep by two feet wide was maintained on the vibrating conveyor. When the conveyor was vibrated with no air flow the pellets formed a relatively dense bed having a density of thirty-five pounds per cubic foot. With air flow alone, blowing in from the slits along the bottoms of the side walls, the pellets ridged up along the center of the conveyor like a miniature sand dune. When the material was subjected to both air flow and vibration, the bed leveled out evenly with the material fluidized and flowing in paths following the air flow from the slits along the conveyor surface to the center, then up to the surface of the material, then along the surface and down the side walls to the air slits. Even with a bed depth of one eighth the width of the bed and air admitted at the edges only, the fluidization was complete and uniform.

This combination of air flow and vibration also increased the heat transfer constant from a value of 10 to 14 without fluidization to a value of approximately 33 with fluidization.

As another example, a bed of plastic pellets, generally in the form of cubes about three sixteenths of an inch on a side, were placed in the conveyor of the first example instead of the flax seed. Even though this bed was only an inch thick it was uniformly fluidized.

These materials, without the vibration can not be fluidized to any appreciable extent since the air flow immediately channels into little geysers over each air inlet. The vibration effectively controls this factor. It was also apparent that the combination of air flow and vibration was very gentle in its action since even with the comparatively fragile pellets, just mentioned, which were an intermediate product in the manufacture of plastic materials, there was very little dusting or breaking up of the pellets. This and the fact that fluidizing can be accomplished with a minimum of air flow when assisted by vibration results in very little dust or product loss with the fluidizing gas.

In conclusion, it is pointed out that while the illustrated example constitutes a practical embodiment of my invention, I do not limit myself to the exact details shown, since modification of the same may be varied without departing from the spirit of this invention.

Having described the invention, I claim:

1. Mixing conveyor apparatus comprising, in combination: a conveyor trough to receive material having fluidizable components; means for vibrating said trough such that said material is conveyed along said trough; means for passing an aeriform fluid up through said material at a velocity sufficient to fluidize the vibrated material but less than the velocity required to fluidize said fluidizable components in the absence of said vibration; said conveyor trough being divided into a plurality of compartments by at least one baffle plate disposed in said conveyor trough transverse to the direction of travel of said material; and a lower extension gate slidably attached to said baffle adapted to control the conveyed flow of non-fluidizable components along said trough.

2. Mixing conveyor apparatus comprising, in combination; a conveyor trough to receive material having fluidizable components; means for vibrating said trough such that said material is conveyed along said trough; means for passing an aeriform fluid up through said material at a velocity sufficient to fluidize the vibrated fluidizable components but less than the velocity required to fluidize said fluidizable components in the absence of said vibration; at least one baffle plate disposed in said conveyor trough transverse to the direction of travel of said material dividing said conveyor trough into a plurality of compartments; a lower extension gate slidably attached to said baffle adapted to control the conveyed flow of non-fluidizable components along said trough; and an upper extension slidably attached to said baffle plate adapted to control the flow of fluidized materials over said baffle plate.

3. Mixing conveyor apparatus comprising, in combination; a conveyor trough to receive material having fluidizable components; means for vibrating said trough such that said material is conveyed along said trough; means for passing an aeriform fluid up through said material at a velocity sufficient to fluidize the vibrated fluidizable material but less than the velocity required to fluidize said fluidizable components in the absence of said vibration, including a conveyor trough which is imperforate and which has slits formed along the sides of said trough to admit said aeriform fluid beneath the material; at least one baffle plate disposed in said conveyor trough and transverse to the direction of travel of said material dividing said conveyor trough into a plurality of compartments; a lower extension gate slidably attached to said baffle adapted to control the conveyed flow of non-fluidizable components along said trough; an upper extension slidably attached to said baffle plate adapted to control the flow of fluidized materials over said baffle plate.

References Cited in the file of this patent

UNITED STATES PATENTS

| | | |
|---|---|---|
| 1,730,189 | Chance | Oct. 1, 1929 |
| 2,279,590 | Haworth | Apr. 14, 1942 |
| 2,346,500 | Moore | Apr. 11, 1944 |
| 2,465,454 | Holt | Mar. 29, 1949 |
| 2,629,938 | Montgomery | Mar. 3, 1953 |
| 2,750,681 | Berry | June 19, 1956 |
| 2,795,318 | Morris | June 11, 1957 |
| 2,876,557 | Ducatteau | Mar. 10, 1959 |
| 2,972,197 | Mickus et al. | Feb. 21, 1961 |

FOREIGN PATENTS

| | | |
|---|---|---|
| 725,266 | Great Britain | Mar. 2, 1955 |